UNITED STATES PATENT OFFICE.

GEO. W. CARLETON, OF BATH, MAINE.

IMPROVEMENT IN FRICTION-MATCHES.

Specification forming part of Letters Patent No. 2,635, dated May 20, 1842.

*To all whom it may concern:*

Be it known that I, GEORGE W. CARLETON, of Bath, in the county of Lincoln and State of Maine, have invented a new and useful Improvement in the Manufacture of Matches for the instantaneous Production of Light by Friction, and which is described as follows:

I prepare the wood by sawing or splitting and dipping in sulphur in the usual manner. I then prepare my compound as follows: I take two pounds of gum-arabic or other viscid substance and dissolve in as little water as possible. I then deposit in a bottle holding one gallon one and one-fourth pound of the best phosphorus and add to it enough of my diluted arabic to cover the same. I then immerse my bottle in hot water for the purpose of fusing the phosphorus, and when it becomes fused I give the contents a violent shaking in order to subdivide the particles of phosphorus. Then to prevent their reunion I add the remainder of my arabic and mix by shaking. I then add it to a fulminating compound composed of the following articles, viz: two pounds subcarbonate of potassa, three pounds nitrate of potassa, and one pound of sulphur. I then grind all the ingredients together in the manner of grinding paint, and put up for future use or exportation in vessels suitable for the same.

To add beauty to the composition I usually add some coloring ingredient, and when desirous of hastening the process of manufacturing I use glue, or glue and arabic, in combination with the other ingredients, as follows: I melt my glutinous ingredients as glue is usually melted and pour upon my phosphorus while hot, which melts it; and after giving it a thorough shaking I immerse the bottle in cold water and shake it there until the compound has assumed consistency enough to keep the particles of phosphorus from reuniting. Then I proceed as before specified.

My manner of dipping is as follows: I spread the composition upon a marble slab, stone, or table of suitable size to accommodate any number of persons required for dipping. I then dry, varnish, wrap, and pack in the usual manner. The fulminating compound herein described I substitute as a body or incrustment for retaining the phosphorus secure from decomposition, that the requisite quantity of phosphorus may be less than in the insoluble and non-combustible ingredients composing the incrustment of all other matches, thereby making the articles which I use enter into the support of combustion; and by my method of compounding the alkalies used in other ignitible preparations to facilitate the union of the particles, and the obnoxious gas arising from heat by other modes of combining is effectually avoided; and, being compounded with a viscid substance cold, of such consistency as not to dissolve its particles, the chemical action that would probably attend its admixture in the liquid state is hereby prevented; and as it is consumed instantaneously by the fire of the phosphorus the generation of gases and the fulmination that would otherwise attend it are hereby avoided. It unites with the glutinous ingredients and phosphorus very readily, and by my mechanical means of compounding forms a dense and strong tenacious substance which burns when ignited by the flame of the phosphorus in a manner strongly resembling gunpowder, leaves little or no residue, and is infallibly certain of igniting the wood. Therefore

What I claim as my invention, and wish to secure by Letters Patent, is—

A paste for making friction-matches of the materials herein described, thereby dispensing with the non-combustible ingredients of other ignitible compositions of matter, causing my ingredients to enter into the support of the combustion, and making the use of so large a quantity of phosphorus as is generally used entirely unnecessary.

G. W. CARLETON.

Witnesses:
JOHN P. FLINT,
R. P. MORSE.